United States Patent [19]

Takahashi

[11] Patent Number: 4,931,824
[45] Date of Patent: Jun. 5, 1990

[54] CAMERA BOOSTING CIRCUIT

[75] Inventor: Hiroshi Takahashi, Hachioji, Japan

[73] Assignee: Konica Corporation, Tokyo, Japan

[21] Appl. No.: 316,640

[22] Filed: Feb. 28, 1989

[30] Foreign Application Priority Data

Mar. 1, 1988 [JP] Japan .................................. 63-45850

[51] Int. Cl.$^5$ .............................................. G03B 7/26
[52] U.S. Cl. ................................... 354/484; 354/145.1
[58] Field of Search ............................... 354/484, 145.1

[56] References Cited

U.S. PATENT DOCUMENTS 4,572,640 2/1986 Harigaya et al. .................... 354/484
4,692,013 9/1987 Okino ................................ 354/145.1

Primary Examiner—L. T. Hix
Assistant Examiner—David M. Gray
Attorney, Agent, or Firm—Finnegan, Henderson, Farabow, Garrett, and Dunner

[57] ABSTRACT

A camera boosting circuit includes an oscillating transistor, a depletion FET, an oscillating boosting circuit, and a control circuit. The oscillating transistor converts a DC voltage of a camera power source battery into an AC voltage. The oscillating boosting circuit converts the DC voltage into an AC voltage together with the oscillating transistor, boosts the AC voltage using a transformer, and obtains a high DC voltage by rectifying the boosted AC voltage. The control circuit controls an oscillating operation of the transistor by ON-/OFF-operating the FET.

3 Claims, 2 Drawing Sheets

CAMERA BOOSTING CIRCUIT

BACKGROUND OF THE INVENTION

1. Field of the Invention

The present invention relates to a camera boosting circuit.

2. Description of the Prior Art

Some cameras comprise a boosting circuit for boosting a power source voltage of 3 to 6 V up to a voltage of about 300 V for operating a flash unit. An oscillating transistor for converting DC power into AC power is generally used in this boosting circuit.

FIG. 2 shows an automatic flash unit charging circuit using a conventional camera boosting circuit. Referring to FIG. 2, reference numeral 1 denotes an oscillating transistor; 2, an oscillation stop transistor connected in the emitter-base path of the oscillating transistor 1; 3, a bias resistor; 4, an oscillating boosting circuit, constituted by a coil, a transformer, or the like, for converting a DC voltage into an AC voltage together with the oscillating transistor 1, boosting the AC voltage by the transformer, and obtaining a high DC voltage by rectifying the boosted AC voltage; and 5, a control circuit constituted by a microcomputer and the like. When an oscillation start signal (Low (L)-level signal) is output from an output terminal $P_1$ of the control circuit 5 to a start terminal ST 4, of the oscillating boosting circuit 4, which is connected to the base of the oscillating transistor 1, is set at "L" level so as to set the oscillating transistor 1 in an operative state. As a result, oscillation is started, and an output from the oscillating boosting circuit 4 is charged in a capacitor 6. At this time, an output from an output terminal $P_2$ of the control circuit 5 is set at "H" (High) level. When a detector 7 detects that the voltage of the capacitor 6 reaches a predetermined value, an oscillation stop signal ("H"-level signal) is output from the output terminal $P_1$ of the control circuit 5 to the start terminal ST of the oscillating boosting circuit 4. In addition, in order to reliably stop oscillation, an "L"-level signal is output from the output terminal $P_2$ of the control circuit 5 to the of the oscillation stop transistor 2, thus turning on the oscillation stop transistor 2. As a result, the emitter-base path of the oscillating transistor 1 is short-circuited, and oscillation is reliably stopped. Thereafter, a trigger circuit 8 is operated by a signal output from the control circuit 5, and a discharge tube 9 emits light.

In such a conventional circuit, at least two signal lines (denoted by reference symbols A and B in FIG. 2) must be connected to the control circuit 5 so as to control start and end operations of oscillation. In addition, this circuit is unstable in an oscillation stop state. That is, the circuit may be forcibly operated when, for example, it receives external strong noise or leakage occurs near the start terminal ST of the oscillating boosting circuit 4 because of dew condensation or high humidity. In order to prevent such an operation error, the oscillation stop transistor be kept ON, and the emitter-base path of the oscillating transistor 1 may be short-circuited. However, if such an arrangement is employed, the transistor 2 must be kept ON even during a period in which a flashing operation is not performed. As a result, the current consumption of the circuit is inevitably increased.

SUMMARY OF THE INVENTION

The present invention has been made in the above-described situation, and has as its object to reliably control an oscillating operation of an oscillator used in a camera boosting circuit with a simple arrangement.

In order to achieve the above object, according to the present invention, a depletion type FET is connected in the emitter-base path of an oscillating transistor constituting a boosting circuit, and an operation of the oscillating transistor is controlled by ON/OFF-operating the FET.

DETAILED DESCRIPTION OF THE PREFERRED EMBODIMENT

The present invention will be described below with reference to the accompanying drawings.

Figure 1:
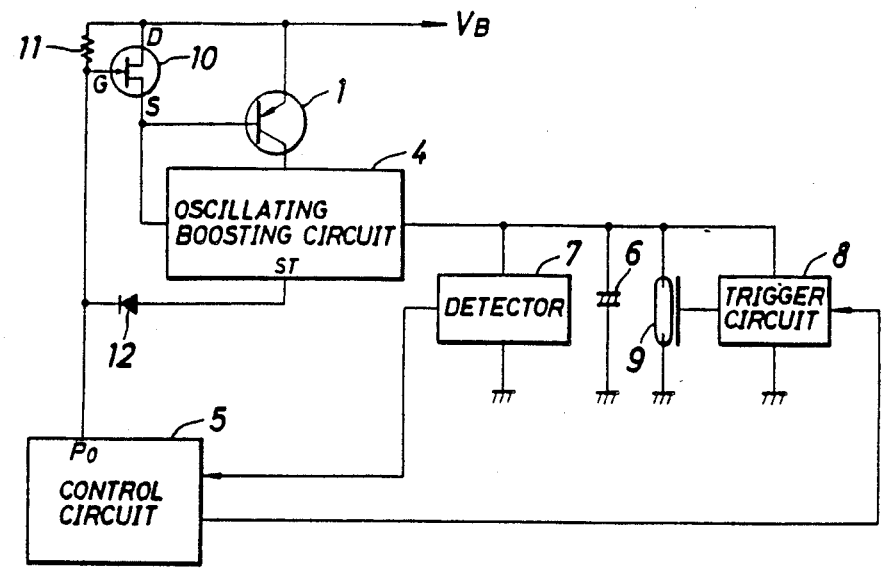
FIG. 1 is a circuit diagram showing a camera boosting circuit according to an embodiment of the present invention, which is applied to an automatic flash unit charging circuit.

FIG. 1 is a circuit diagram showing a camera boosting circuit according to an embodiment of the present invention. The same reference numerals in FIG. 1 denote the same parts as in FIG. 2.

Figure 2:
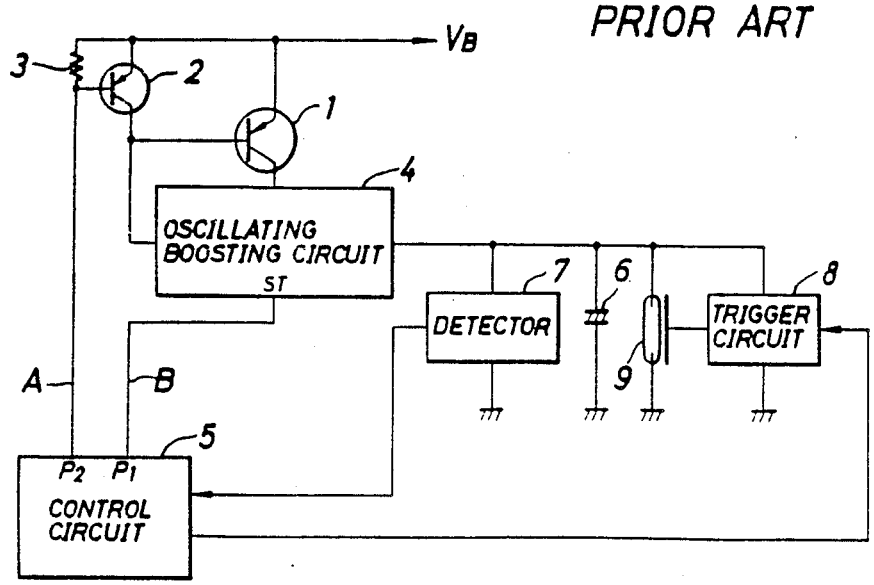
FIG. 2 is a circuit diagram showing a conventional camera boosting circuit.

In this circuit, an n-channel junction FET 10 is used in place of the oscillation stop transistor 2 in the circuit shown in FIG. 2. More specifically, the drain (D) and the source (S) of the FET 10 are respectively connected to the emitter and the base of an oscillating transistor 1. A bias resistor 11 is connected in the drain (D)-gate (G) path of the FET 10.

The gate of the FET 10 is connected to an output terminal $P_0$ of a control circuit 5. In addition, a start terminal ST of an oscillating boosting circuit 4 is connected to the output port $P_0$ through a diode 12.

With this arrangement, oscillation start and end operation can be reliably controlled by using a single signal line connected to the output terminal $P_0$ of the control circuit 5. More specifically, when a flashing operation is not required, the output terminal $P_0$ is kept at "H" level. In this case, no current flows through the oscillating boosting circuit 4, and an oscillating operation is not performed for the following reason. At this time, the FET 10 is set in an ON state, and the resistance of the D-S path of the FET 10 is several tens $\Omega$. Therefore, the emitter-base path of the oscillating transistor 1 is short-circuited, so that the oscillating transistor 1 is not operated.

When a photographing operation is performed, and a determination circuit (not shown) determines that the brightness of an object to be photographed requires a flashing operation, the output terminal $P_0$ of the control circuit 5 is set at "L" level, and the start terminal ST of the oscillating boosting circuit 4 is also set at "L" level. A gate voltage is then applied to the FET 10, and the resistance of the D-S path becomes several $M\Omega$. As a result, the oscillating transistor 1 is operated to start oscillation. When a detector 7 detects completion of charging, the output terminal $P_0$ is set at "H" level again, and the oscillating operation is stopped. Note that the diode 12 is arranged to prevent reverse biasing. If the diode 12 is not connected to the oscillating boosting circuit 4, the potential at the start terminal ST of the circuit 4 may become negative. In such a case, the FET 10 is reversely biased, and the resistance of the D-S path is not decreased. As a result, even if the output terminal $P_0$ is set at "H" level, the oscillating transistor 1 may not be turned off. In order to prevent such an operation error, the diode 12 is used to prevent a current from flowing in the reverse direction.

After the oscillating operation is stopped, a trigger circuit 8 is operated by a signal from the control circuit 5 so as to cause a discharge tube 9 to emit light.

Since the emitter-base path of the oscillating transistor 1 is short-circuited in an oscillation stop state, the circuit does not perform an oscillating operation even if external noise or leakage occurs, during an energization operation or a flashing operation. In addition, since the FET is used, power is not consumed to keep the oscillating transistor 1 in an OFF state.

Figure 3:
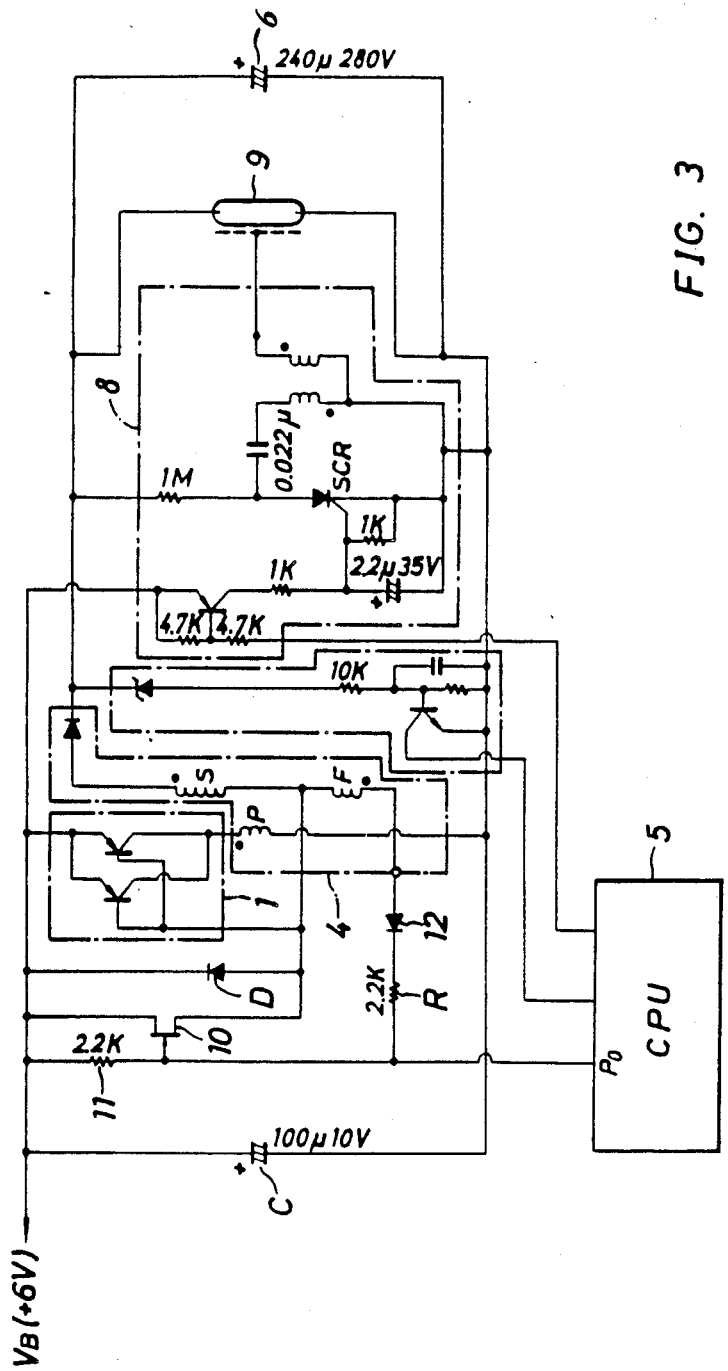
FIG. 3 is a circuit diagram showing a further detailed arrangement of the circuit shown in FIG. 1.

FIG. 3 is a circuit diagram showing a further detailed arrangement of the circuit shown in FIG. 1. The same reference numerals in FIG. 3 denote the same parts as in FIG. 1. Referring to FIG. 3, reference symbol C denotes a capacitor for stabilizing a power source by keeping its impedance sufficiently low with respect to an injected current upon operation of the oscillating boosting circuit; D, a diode for suppressing a counter electromotive force applied to the emitter-base path of the oscillating transistor 1 so as to prevent the oscillating transistor 1 from being damaged by the counter electromotive force generated at the base of the oscillating transistor 1 upon operation of the oscillating boosting circuit; and R, a resistor for suppressing a base current during energization and operation of the oscillating transistor 1. The oscillating boosting circuit 4 is constituted by a primary coil P, a secondary coil S, a feedback coil F, and a rectifying diode.

Although the junction FET is used in the embodiment, a MOSFET can be used instead. In the embodiment, the automatic flash unit charging circuit is exemplified. However, the present invention can be applied to other boosting circuits used in cameras, e.g., a distance measuring boosting circuit for driving an infrared LED.

As has been described above, according to the present invention, a depletion type FET is connected in the emitter-base path of an oscillating transistor constituting a boosting circuit, so that an operation of the oscillating transistor is controlled by ON/OFF-operating the FET. Therefore, an oscillating operation of an oscillating circuit used for a camera boosting circuit can be reliably controlled with a simple arrangement.

Although the present invention has been described in terms of the presently preferred embodiment, it is to be understood that such disclosure is not to be interpreted as limiting. Various attentions and modifications will no doubt become apparent to those skilled in the art after having read the above disclosure. Accordingly, it is intended that the appended claims be interpreted as covering all alterations and modifications as fall within the true spirit and scope of the invention.

What I claim is:

1. A camera boosting circuit comprising:
    an oscillating transistor for converting a DC voltage of a camera power source battery into an AC voltage;
    a depletion FET connected in an emitter-base path of said oscillation transistor;
    oscillating boosting means for converting the DC voltage into the AC voltage together with said oscillating transistor, boosting the AC voltage using a transformer, and obtaining a high DC voltage by rectifying the boosted AC voltage; and
    control means for controlling an oscillating operation of said transistor by ON/OFF operation of said FET.

2. A circuit according to claim 1 wherein the FET includes a gate electrode, the oscillating boosting means includes a start terminal for starting oscillation of the oscillating boosting means, and the circuit further comprises reverse bias preventing means connected between the start terminal and the gate electrode of said FET for preventing reverse flow of current to the start terminal.

3. A camera flash unit driving circuit comprising:
    oscillation means including a transistor having an emitter-base path for converting a DC voltage of a camera power source battery into an AC voltage;
    a depletion FET connected in the emitter-base path of the transistor of the oscillation means;
    oscillating boosting means for converting the DC voltage into the AC voltage together with the oscillation means, for boosting the AC voltage using a transformer and for obtaining a high DC voltage by rectifying the boosted AC voltage; and
    control means for controlling an oscillating operation of the transistor by ON/OFF-operation of the FET.

* * * * *